(12) United States Patent
Lovicott et al.

(10) Patent No.: US 8,171,314 B2
(45) Date of Patent: May 1, 2012

(54) SYSTEM AND METHOD FOR INFORMATION HANDLING SYSTEM HYBRID SYSTEM LEVEL AND POWER SUPPLY COOLING

(75) Inventors: Dominick Lovicott, Round Rock, TX (US); Paul Artman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 426 days.

(21) Appl. No.: 12/537,363

(22) Filed: Aug. 7, 2009

(65) Prior Publication Data

US 2011/0035606 A1 Feb. 10, 2011

(51) Int. Cl.
*G06F 1/001* (2006.01)
(52) U.S. Cl. ........................................................ 713/300
(58) Field of Classification Search ................... 713/300
See application file for complete search history.

(56) References Cited

U.S. PATENT DOCUMENTS

| | | | |
|---|---|---|---|
| 6,349,385 B1 | 2/2002 | Kaminski et al. | |
| 6,654,894 B2 | 11/2003 | Kaminski et al. | |
| 6,901,303 B2 * | 5/2005 | Larson et al. | 700/108 |
| 7,583,043 B2 * | 9/2009 | Chung et al. | 318/634 |
| 2004/0085727 A1 * | 5/2004 | Kim | 361/687 |
| 2008/0065912 A1 * | 3/2008 | Bodner et al. | 713/300 |

* cited by examiner

*Primary Examiner* — Thomas Lee
*Assistant Examiner* — Xuxing Chen
(74) *Attorney, Agent, or Firm* — Hamilton & Terrile, LLP; Robert W. Holland

(57) ABSTRACT

Information handling system thermal conditions are controlled by hybrid interaction between a system thermal manager and a power supply thermal manager. The system thermal manager sets a speed for system cooling fans and for a power supply cooling fan. The power supply thermal manager determines a speed for the power supply cooling fan and also receives the speed for the power supply cooling fan determined by the system thermal manager. The power supply thermal manager commands the power supply fan to run at a selected of the determined speeds based upon one or predetermined conditions, such as by the selecting the greater of the determined speeds.

14 Claims, 3 Drawing Sheets

SYSTEM AND METHOD FOR INFORMATION HANDLING SYSTEM HYBRID SYSTEM LEVEL AND POWER SUPPLY COOLING

BACKGROUND OF THE INVENTION

1. Field of the Invention

The present invention relates in general to the field of information handling system thermal management, and more particularly to a system and method for information handling system hybrid system level and power supply cooling.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system capabilities have improved as processing components used to build information handling systems have become more powerful. One example of this is that more powerful central processing units (CPUs) are able to perform greater numbers of calculations in less time. Another example of this is that microprocessors are included in greater numbers of components thus giving the components greater intelligence to handling system management functions. For instance, many server information handling systems include a baseboard management controller (BMC) that manages operation of the server, such as by allowing remote power up and power down commands. The BMC typically includes a basic microprocessor that executes firmware to allow out-of-band communications even if the rest of the server information handling system is powered down. The BMC often has thermal and power management functions that define operational constraint for the information handling system, such internal system temperatures and component power consumption. In some instances, the BMC operates cooling fans that provide cooling airflow to information handling system components. An advantage of this arrangement is that end users can remotely monitor thermal conditions within the server information handling system through out-of-band network communications, and can remotely manage operation of individual components through a management bus, such as an I2C bus.

As the cost of microprocessors has decreased, microprocessors have found their way into a variety of different types of components used to build information handling systems. One example of a component that has become more intelligent with the addition of a microprocessor is the power supply unit (PSU). Increased intelligence within a power supply has allowed the power supply to manage its own thermal parameters with control over a fan included in the power supply. In the past, a power supply thermal manager ran on the BMC or in a Basic Input/Output System (BIOS) or other firmware executing at a system level. Power supply temperature outputs were read by the BMC and applied by a BMC thermal manager to determine an appropriate response, such as a power supply cooling fan speed that is communicated from the BMC to the power supply. More advanced power supplies with more powerful microprocessors have onboard cooling fan control that allows the power supply to determine its own cooling requirements and fan speed settings. One difficulty with power supply based thermal management is that different thermal management profiles are often needed for different types of information handling systems, increasing the complexity of leveraging a give power supply across multiple types of information handling systems. Imbalance in the airflow of the power supply cooling fan and the cooling fan or fans of the information handling system can result in increased fan speeds that increase system acoustics and power consumption, particularly when operation of the power supply cooling fan starves airflow to the information handling system cooling fan or fans.

SUMMARY OF THE INVENTION

Therefore a need has arisen for a system and method which provides hybrid power supply fan control that interacts with system level thermal management provided by a management controller, such as a BMC.

In accordance with the present invention, a system and method are provided which substantially reduce the disadvantages and problems associated with previous methods and systems for thermal management of an information handling system power supply. A power supply applies a locally determined power supply fan speed or a distally determined power supply fan speed based upon one or more factors. Hybrid control of power supply fan speed improves cooling efficiency, power consumption and acoustics by applying the best fitting speed for detected power supply or system thermal conditions.

More specifically, an information handling system processes information through coordinated communications of processing components that are powered by a power supply. The power supply is maintained within thermal constraints by a thermal manager that sets a speed for a power supply cooling fan. The information handling system is maintained within thermal constraints by system thermal manager that sets a speed for a system cooling fan to provide cooling airflow to the processing components. Hybrid power supply cooling fan speed management is achieved by determining a power supply cooling fan speed at the system thermal manager and communicating the power supply cooling fan speed to the power supply. The power supply determines whether to use its locally determined cooling fan speed or the system thermal manager's cooling fan speed based on predetermined factors, such as by selecting the higher of the two power supply cooling fan speeds.

The present invention provides a number of important technical advantages. One example of an important technical advantage is that hybrid power supply fan control allows a single power supply model to be leveraged across a variety of information handling system platform models with an ability to optimize power supply fan control on a per system basis. Selection of fan speed commands from either a power supply thermal manager or a system level thermal manager, such as in BMC or BIOS ensures that minimum power supply cooling will be available with optional increased power supply fan speed as needed to optimize system level cooling. Hybrid power supply cooling that takes into consideration system level cooling parameters allows reduced power consumption and reduced acoustics by minimizing power supply and system cooling fan speeds.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
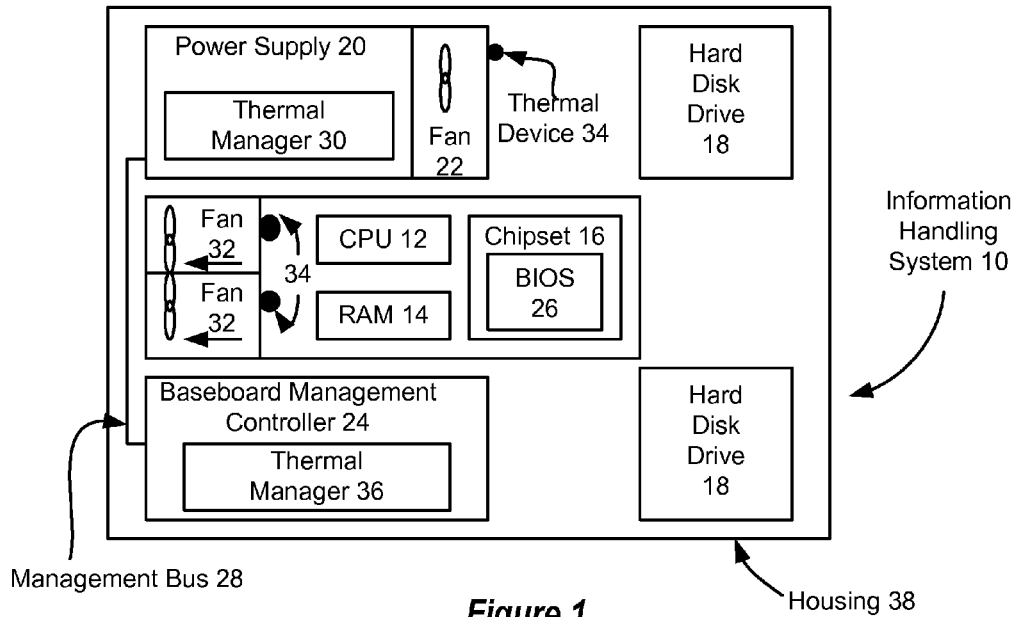
FIG. 1 depicts a block diagram of an information handling system having hybrid power supply and system manager control of power supply cooling fan operations in a parallel configuration.

Referring now to FIG. 1, a block diagram depicts an information handling system 10 having hybrid power supply and system manager control of power supply cooling fan operations in a parallel configuration. Information handling system 10 processes information through cooperation of a variety of processing components, such as a CPU 12, RAM 14, a chipset 16 and hard disk drives 18. Power to run the processing components is provided from a power supply 20 that is cooled by a power supply cooling fan 22. Management of system level functions is performed by a management processor, such as a baseboard management controller (BMC) 24 or a BIOS 26 running on processor within chipset 16. Baseboard management controller 24 communicates with processing components through a management bus 28 to support such functions as remote power up and power down. Power supply cooling fans 22 provide cooling airflow to power supply 20 based upon commands provided from a power supply thermal manager 30. System level cooling for information handling system 10 is provided by system cooling fans 32 based upon commands provided from a system thermal manager 36 running on baseboard management controller 24. Power supply thermal manager 30 and system thermal manager 36 determine fan speeds based upon thermal conditions within housing 38 of information handling system 10 as measured by thermal measuring devices 34. For example, thermal conditions might include temperatures at cooling fan intakes and exits, at processing component locations or at other locations within housing 38.

In operation, hybrid power supply cooling management is provided by cooperation between power supply thermal manager 30 and system thermal manager 36. Power supply thermal manager 30 monitors thermal conditions associated with power supply 20, such as inlet, outlet and component temperatures of power supply 20 to define a fan speed for operation of power supply cooling fan 22 that will maintain desired thermal conditions at power supply 20. At the same time, system thermal manager 36 monitors thermal conditions throughout housing 38 to define a fan speed for both power supply cooling fan 22 and for system cooling fans 32 that will maintain desired thermal conditions for information handling system 10 as a whole. System thermal manager 36 provides power supply thermal manager 30 with a speed for power supply cooling fan 22, such as through management bus 28. Power supply thermal manager 30 compares the fan speed for power supply cooling fan 22 as determined locally by power supply thermal manger 30 and distally by system thermal manager 36 and selects which fan speed to use at power supply cooling fan 22 based on one or more factors. For example, power supply thermal manager 30 applies the locally or distally determined fan speed by selecting the higher fan speed value. Alternatively, power supply thermal manager 30 selects the fan speed based on conditions stored within power supply 20, such as those depicted by FIG. 3. As another alternative, system thermal manager 36 makes a determination of an override condition and provides an override signal through management bus 28 that compels selection of a particular fan speed by power supply thermal manager 30.

Figure 2:
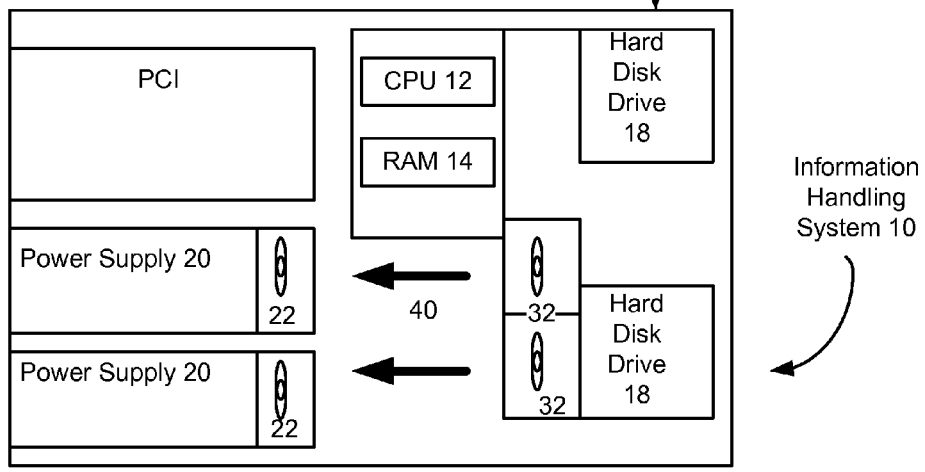
FIG. 2 depicts a block diagram of an information handling system having hybrid power supply and system manager control of power supply cooling fan operations in a series configuration.

Referring now to FIG. 2, a block diagram depicts an information handling system having hybrid power supply and system manager control of power supply cooling fan operations in a series configuration. The series configuration of FIG. 2 has power supply cooling fans 22 and system cooling fans aligned along an airflow axis 40 so that airflow provided by power supply cooling fans 22 is additive to air flow provided by system cooling fans 32. By comparison, the parallel configuration depicted by FIG. 1 has power supply cooling fans 22 competing to some extent with system cooling fans 32 so that an imbalance between the operation of the power supply and system cooling fans can create a stagnation that leads to excessive fan speed operations to maintain desired thermal conditions. System thermal manager 36 adapts the speed of power supply cooling fans 22 as necessary to achieve desired system operations. By analyzing system level conditions based upon an information handling system's configuration, system thermal manager 36 allows a common power supply to be used in a variety of different information handling systems having different configurations by modifying power supply cooling fan operations from a system-specific system thermal manager.

Figure 3:
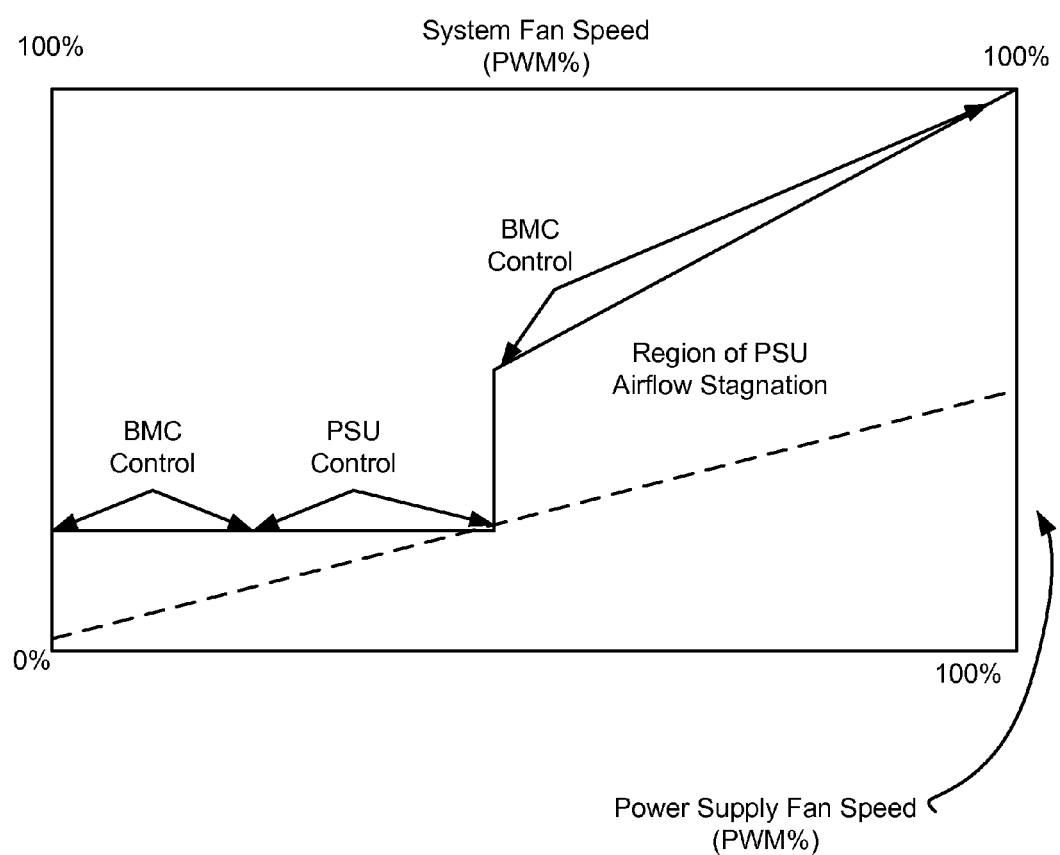
FIG. 3 depicts an example of hybrid power supply and system manager control of power supply cooling fan operations at a range of fan speeds.

Referring now to FIG. 3, an example of hybrid power supply and system manager control of power supply cooling fan operations at a range of fan speeds is depicted. Control of power supply cooling fan operations effectively shifts between a standard one-size-fits all power supply and a system specific thermal manager of a baseboard management controller or BIOS based upon operating conditions at the information handling system. In one embodiment, parameters for power supply cooling, such as those depicted by FIG. 3, are downloaded from a baseboard management controller to a power supply processor to help the power supply thermal manager running on the power supply processor to cooperate with the system thermal manager.

Figure 4:
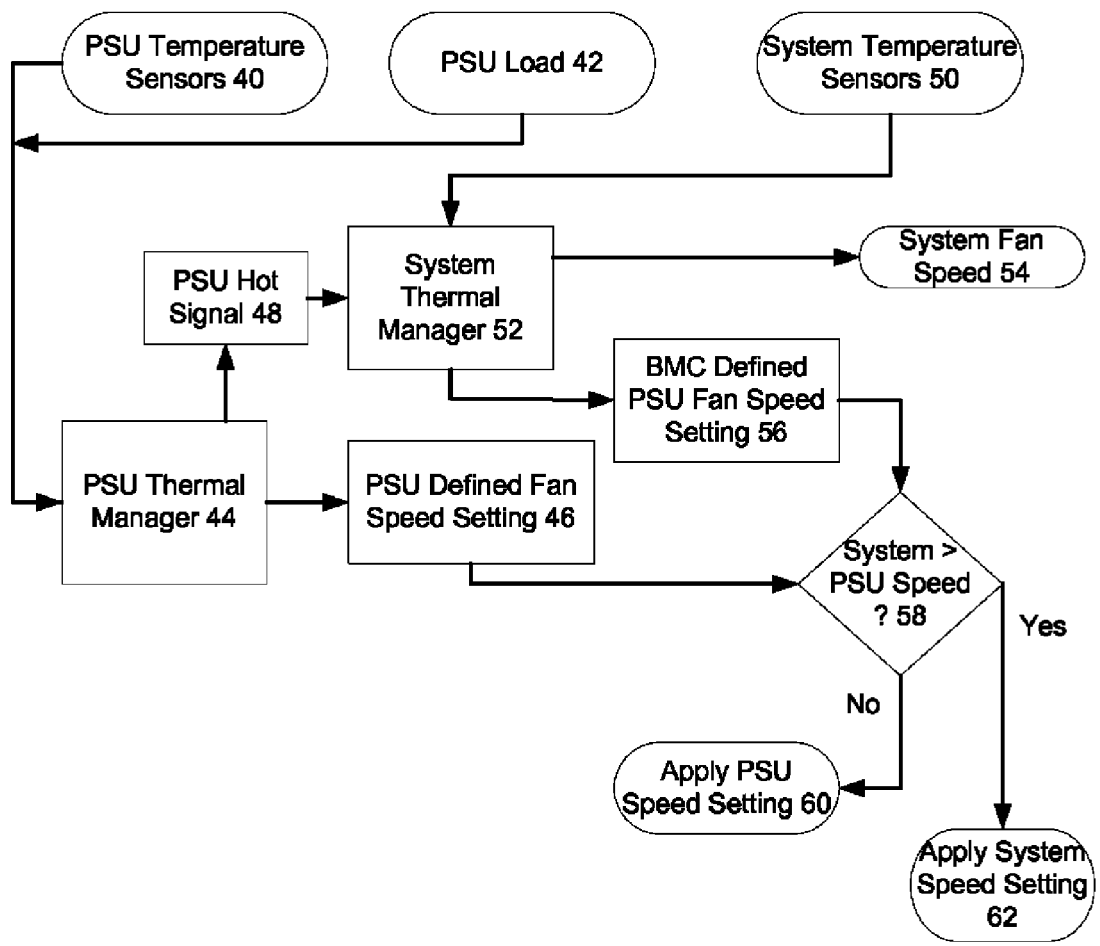
FIG. 4 depicts a flow diagram of a process for hybrid power supply and system control of power supply cooling fan operations.

Referring now to FIG. 4, a flow diagram depicts a process for hybrid power supply and system control of power supply cooling fan operations. The process begins at step 40 with readings by the power supply unit thermal sensors and step 42 with measurements of the power supply unit load. At step 44, the power supply unit thermal measurements and load measurements are applied to determine locally at the power supply unit a power supply unit defined fan speed at step 46. If the power supply unit detects an over temperature condition at step 48, an over temperature warning issues to the baseboard management controller to take appropriate action, such as a system shut down. At step 50, system level thermal sensors detect predetermined system level thermal conditions and provide the thermal conditions to the system thermal manager at step 52. The system thermal manager determines system fan speeds at step 54 and controls operation of the system fans. At step 56, the system thermal manager determines a power supply unit fan speed based upon the system thermal conditions and provides the fan speed to the power supply unit processor. At step 58, the power supply unit processor compares the power supply fan speed determined locally with the power supply fan speed determined by the system thermal manager and selects the power supply fan speed to apply at the power supply cooling fan. In the example embodiment depicted by FIG. 4, the power supply thermal manager running on the power supply processor selects the greater of the two fan speeds. At step 58, if the system thermal manager fan speed is not greater than the power supply unit fan speed, then at step 60 the power supply unit applies the locally determined fan speed. If at step 58 the system thermal manager fan speed is greater than the power supply unit fan speed, then at step 62, the power supply unit thermal manager applies the system thermal manager fan speed.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a CPU disposed in the housing and operable to process information;
   memory disposed in the housing and interfaced with the CPU, the memory operable to store information;
   one or more thermal measurement devices disposed in the housing and operable to measure one or more thermal parameters;
   a management processor disposed in the housing and interfaced with the thermal measurement devices, the management processor operable to perform one or more management functions;
   one or more system cooling fans interfaced with the management processor and operable to generate a cooling airflow in the housing;
   a system thermal manager running on the management processor and operable to apply the thermal parameters to operate the system cooling fan at a selected speed; and
   a power supply disposed in the housing and operable to power at least the CPU, the power supply having a cooling fan and a thermal manager, the power supply thermal manager interfaced with the system thermal manager and operable to run the power supply cooling fan at a selected of a speed determined locally at the power supply or a speed determined distally at the system thermal manager;
   wherein the system thermal manager is further operable to load thermal management parameters to the power supply thermal manager that define the locally determined power supply fan speed.

2. The information handling system of claim 1 wherein the selected of the locally determined or distally determined speed set for the power supply cooling fan is the higher of the locally determined or distally determined speed.

3. The information handling system of claim 1 wherein the system cooling fan and the power supply cooling fan are aligned in a series arrangement so that the system thermal manager estimates power supply cooling fan speed to set system cooling fan speed.

4. The information handling system of claim 1 wherein the system cooling fan and the power supply cooling fan are aligned in a parallel arrangement so that the system thermal manager estimates power supply cooling fan speed to set system cooling fan speed.

5. The information handling system of claim 1 wherein the system thermal manager provides an override command to the power supply thermal manager, the override command selecting the locally determined or the distally determined power supply cooling fan speed.

6. The information handling system of claim 1 wherein the management processor comprises a baseboard management controller.

7. The information handling system of claim 1 wherein the management processor comprises a BIOS.

8. A method for thermal management at an information handling system comprising:
   detecting one or more thermal parameters at one or more locations within the information handling system;
   communicating the thermal parameters to a management processor;
   determining with the management processor a fan speed setting of one or more system cooling fans and one or more power supply cooling fans;
   detecting one or more thermal parameters at a power supply;
   determining with a power supply processor at the power supply a fan speed setting of the one or more power supply cooling fans;
   communicating power supply cooling fan speed determined by the management processor to the power supply processor;
   selecting with the power supply processor the fan speed determined by the management processor or the power supply processor based upon one or more predetermined conditions; and
   in response to a priority signal, overriding the fan speed of the power supply processor by selecting the fan speed determined by the management processor to decrease the fan speed of the power supply.

9. The method of claim 8 wherein the management processor comprises a baseboard management controller.

10. The method of claim 8 wherein the management processor comprises a BIOS.

11. The method of claim 8 wherein the predetermined condition comprises a determination at the management processor to prioritize the power supply fan speed determined by the management processor, the method further comprising:

sending a priority signal from the management processor to the power supply processor; and applying the priority signal at the power supply processor to select the fan speed determined by the management processor.

12. The method of claim 8 further comprising:

retrieving to the management processor a power supply identifier of the power supply; and programming the power supply with thermal management parameters based upon the identifier.

13. The method of claim 12 wherein the power supply thermal management parameters are based at least in part upon a series relationship of the power supply cooling fans and the system cooling fans.

14. The method of claim 12 wherein the power supply thermal management parameters are based at least in part upon a parallel relationship of the power supply cooling fans and the system cooling fans.

* * * * *